US012625640B2

(12) United States Patent
Kale

(10) Patent No.: US 12,625,640 B2
(45) Date of Patent: May 12, 2026

(54) OPERATING MEMORY DIE BASED ON TEMPERATURE DATA

(71) Applicant: Micron Technology, Inc., Boise, ID (US)

(72) Inventor: Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 256 days.

(21) Appl. No.: 17/652,415

(22) Filed: Feb. 24, 2022

(65) Prior Publication Data

US 2023/0266909 A1 Aug. 24, 2023

(51) Int. Cl.
*G06F 12/00* (2006.01)
*G06F 3/06* (2006.01)
(52) U.S. Cl.
CPC .......... *G06F 3/0653* (2013.01); *G06F 3/0604* (2013.01); *G06F 3/0679* (2013.01)
(58) Field of Classification Search
CPC .............................. G06F 3/0653; G06F 3/0679
USPC .......................................................... 711/154
See application file for complete search history.

(56) References Cited

U.S. PATENT DOCUMENTS

| | | | | |
|---|---|---|---|---|
| 7,930,470 B2 * | 4/2011 | Brittain | ..................... | G11C 5/04 |
| | | | | 711/E12.001 |
| 8,879,330 B1 * | 11/2014 | Mu | .................... | G11C 16/3445 |
| | | | | 365/185.29 |
| 9,721,672 B1 * | 8/2017 | Dutta | ................. | G11C 16/0483 |
| 10,156,987 B1 * | 12/2018 | Gutierrez | .............. | G06F 1/3268 |
| 10,922,014 B1 * | 2/2021 | Henze | ................... | G06F 3/0679 |
| 10,971,215 B1 * | 4/2021 | Yang | .................... | G11C 29/023 |
| 2017/0345510 A1 * | 11/2017 | Achtenberg | ....... | G11C 16/3413 |
| 2019/0265888 A1 * | 8/2019 | Yang | .................. | G11C 11/5671 |
| 2019/0278500 A1 * | 9/2019 | Lakshmi | .............. | G06F 3/0688 |
| 2020/0202928 A1 * | 6/2020 | Pio | ..................... | G11C 13/0061 |
| 2020/0402594 A1 * | 12/2020 | Dak | ..................... | G11C 16/32 |
| 2021/0012648 A1 * | 1/2021 | Körner | ................ | G09B 29/007 |
| 2021/0349839 A1 * | 11/2021 | Betser | ................ | G06F 13/1668 |
| 2022/0188208 A1 * | 6/2022 | Gutierrez | ........... | G06F 12/0815 |
| 2022/0300364 A1 * | 9/2022 | Nagaraddi | .......... | G06F 11/0745 |
| 2023/0236738 A1 * | 7/2023 | Huang | .................. | G06F 3/0659 |
| | | | | 711/154 |
| 2023/0266909 A1 * | 8/2023 | Kale | ..................... | G06F 3/0604 |

FOREIGN PATENT DOCUMENTS

WO WO-2017151474 A1 * 9/2017 .......... G06F 11/1068

* cited by examiner

*Primary Examiner* — Mohamed M Gebril
(74) *Attorney, Agent, or Firm* — Holland & Hart, LLP

(57) ABSTRACT

Methods, systems, and devices for operating memory die based on temperature data are described. A memory system may include a set of temperature sensors each corresponding to one of a set of memory dies. A controller at the memory system may receive, from the set of temperature sensors, temperatures measured at the set of memory dies. Then the controller may identify that an operation of a first memory die is associated with an increased likelihood of errors based on the temperature measured at the first memory die. In response, the controller may adjust a parameter for operating the first memory die from a first value to a second value associated with a decreased operating temperature and operate the first memory die according to the second value of the parameter while operating one or more of the other memory dies in the set according to the first value of the parameter.

25 Claims, 5 Drawing Sheets

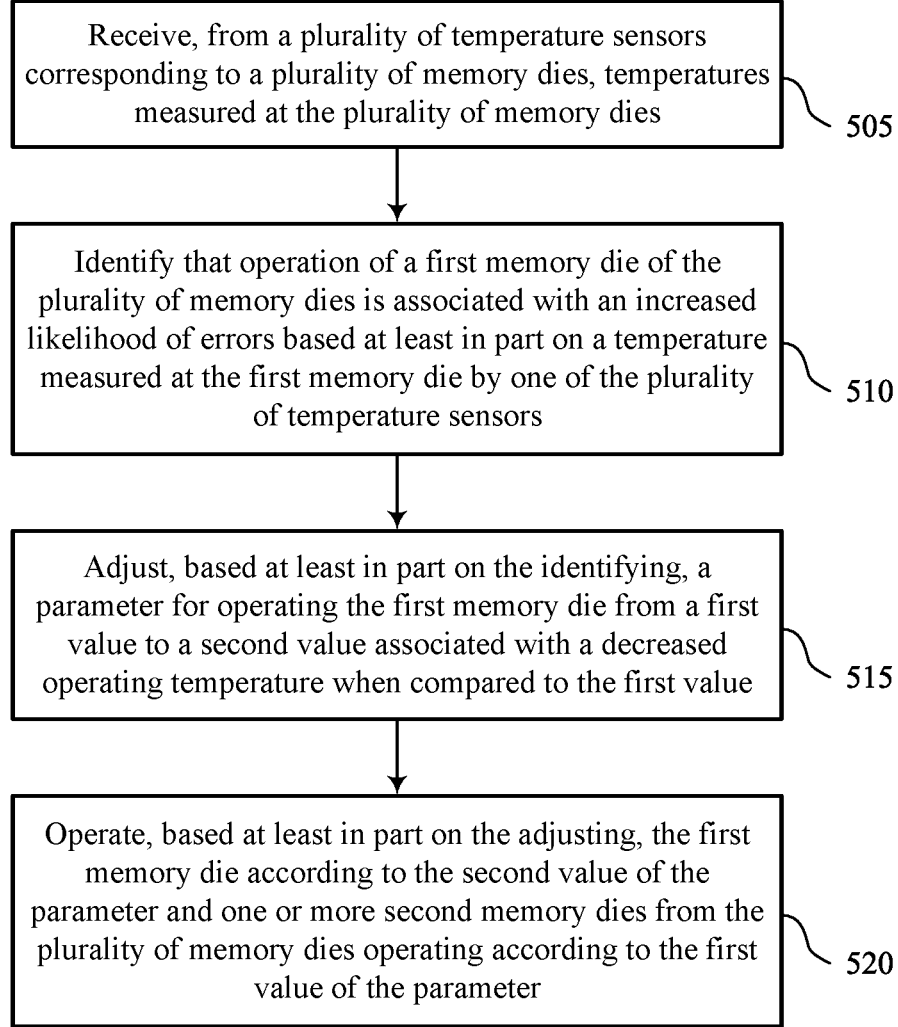

Receive, from a plurality of temperature sensors corresponding to a plurality of memory dies, temperatures measured at the plurality of memory dies

505

Identify that operation of a first memory die of the plurality of memory dies is associated with an increased likelihood of errors based at least in part on a temperature measured at the first memory die by one of the plurality of temperature sensors

510

Adjust, based at least in part on the identifying, a parameter for operating the first memory die from a first value to a second value associated with a decreased operating temperature when compared to the first value

515

Operate, based at least in part on the adjusting, the first memory die according to the second value of the parameter and one or more second memory dies from the plurality of memory dies operating according to the first value of the parameter

OPERATING MEMORY DIE BASED ON TEMPERATURE DATA

FIELD OF TECHNOLOGY

The following relates to one or more systems for memory, including operating memory die based on temperature data.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not- or (NOR) and not- and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIG. 5 shows a flowchart illustrating a method or methods that support operating memory die based on temperature data in accordance with examples as disclosed herein.

DETAILED DESCRIPTION

Figure 1:
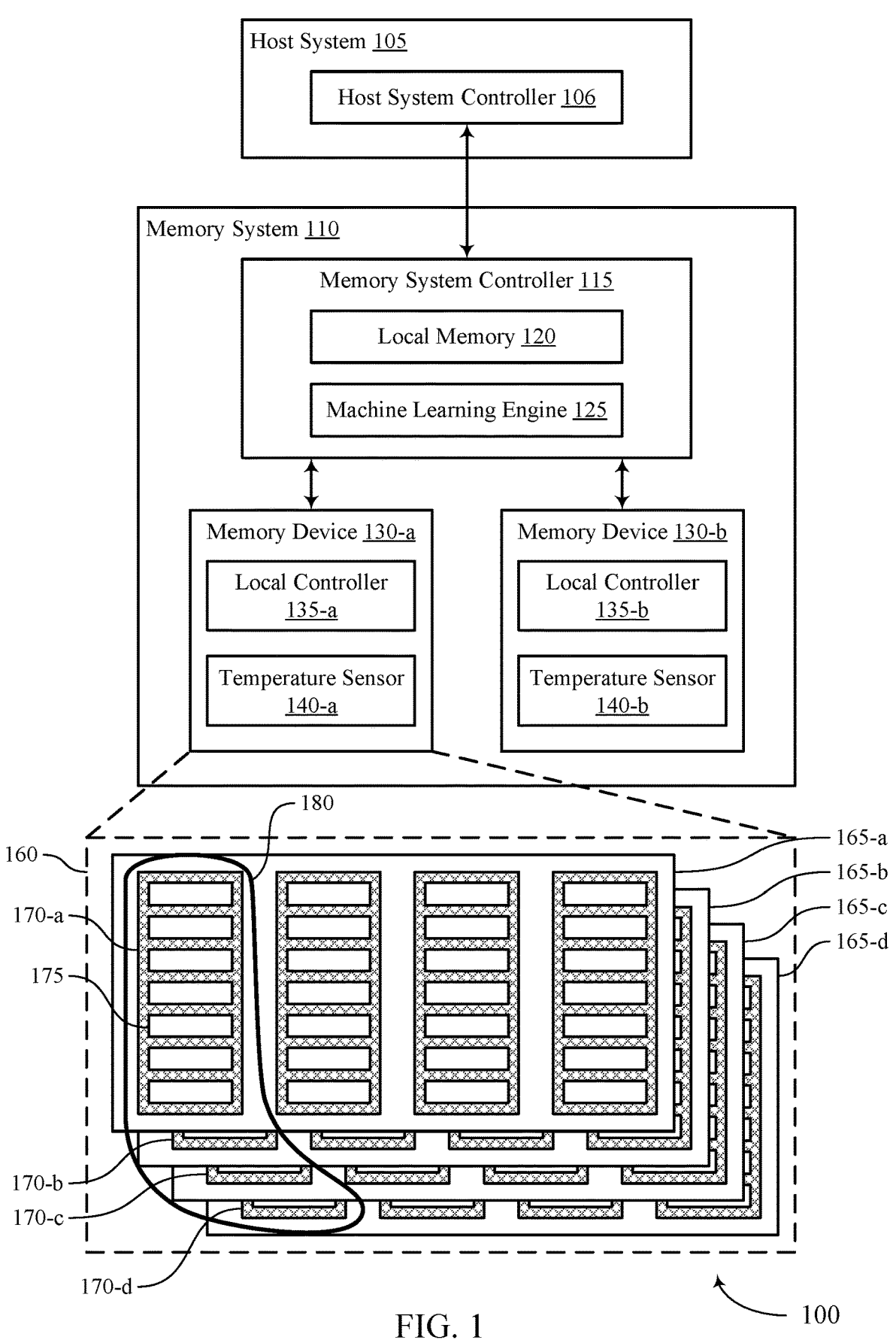
FIG. 1 illustrates an example of a system that supports operating memory die based on temperature data in accordance with examples as disclosed herein.

The reliability of a memory system may be impacted by temperature. For example, a memory system that is a higher temperature may store data less reliably when compared to a memory system that is a lower or more temperate temperature. In another example, a memory system that is exposed to a large temperature range may store data less reliably when compared to a memory system that is exposed to a smaller temperature range. Some memory systems may adjust a parameter for operating the memory system when exposed to temperatures that exceed a threshold to decrease the effects of the temperature on the operations of the memory system. For example, the memory system may decrease a rate of performing access operations when the temperature of the memory system exceeds the threshold. In some instances, adjusting the operations of the memory system in response to the temperature exceeding the threshold may improve a reliability of the memory system (e.g., by decreasing the temperature of the memory system).

Systems, techniques, and devices are described herein for identifying one or more memory dies of a memory system that are associated with an increased likelihood for errors (e.g., a decreased reliability) based on the measured temperatures of the memory dies. That is, the memory system may identify a memory die as being associated with an increased likelihood for errors based on a combination of the measured temperature of the memory die and one or more additional parameters (e.g., previous measured temperatures of the memory die, a quantity of errors previously-detected at the memory die, a type of operations previously-performed at the memory die). Based on identifying the one or more memory dies, the memory system may adjust the operations of the memory dies that are identified as being associated with the increased likelihood of errors (e.g., by adjusting one or more operating parameters to values associated with decreased temperatures). Additionally, the memory system may continue to operate other memory dies (e.g., that were not identified as being associated with the increased likelihood for errors) without adjusting operating parameters to values associated with decreased temperatures.

In some cases, adjusting the operations of memory dies based parameters in addition to a currently-measured temperature of the memory system may enable the memory system to more accurately identify when a memory die is associated with increased likelihoods for errors. Additionally, by adjusting the operations of the subset of the memory dies of the memory system associated with the increased likelihood for errors, a performance (e.g., a throughput) of the memory system may be improved when compared to a memory system that adjusts the operations of every memory die. Thus, adjusting the operations of a subset of identified memory dies based on parameters in addition to the currently measured temperature of the memory system may improve a reliability of the memory system, which may be used by applications with high reliability requirements (e.g., in automotive applications, in aerospace applications).

Features of the disclosure are initially described in the context of a system with reference to FIG. 1. Features of the disclosure are then described in the context of a memory system with reference to FIG. 2. These and other features of the disclosure are further illustrated by and described in the context of flowcharts and an apparatus diagram that relate to operating memory die based on temperature data with reference to FIGS. 3-5.

FIG. 1 illustrates an example of a system 100 that supports operating memory die based on temperature data in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. The memory system controller 115 may additionally include a machine learning engine 125. In some cases, the local memory 120 may store the machine learning engine 125.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof.

Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die 160 or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b. The memory device 130 may include (e.g., on a same die 160 or within a same package) a temperature sensor 140. The temperature sensor 140 may be configured to measure a temperature of the memory device 130 and communicate the measured temperature to the memory system controller 115 (or, in some cases, to a local controller 135). In some cases, the temperature sensor 140 may measure and communicate temperatures to the memory system controller 115 periodically (e.g., according to a periodicity configured by the memory system controller 115). In some other cases, the temperature sensor 140 may measure and communicate temperatures to the memory system controller in response to a request received from the memory system controller 115 or the local controller 135.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system controller 115 or a local controller 135 may receive temperature data from the temperature sensors 140 corresponding to each memory device 130 of the memory system 110. Based on receiving the temperatures measured on each of the memory devices 130, the memory system controller 115 may identify one or more memory devices 130 that are associated with an increased likelihood for errors (e.g., a decreased reliability). For example, the machine learning engine 125 may be configured to receive an input of the measured temperatures and output an indication of one or more memory devices 130 associated with the increased likelihood for errors. The machine learning engine 125 may be preconfigured to identify memory devices 130 that are associated with increased likelihoods for errors based on a combination of one or more parameters such as the measured temperatures received from the temperature sensors 140, historical measured temperature data (e.g., previously received from the temperature sensors 140 and stored in the local memory 120), a quantity of detected errors at each of the corresponding memory devices 130, and a type of operations performed at each of the corresponding memory devices 130.

Based on identifying one or more memory devices 130 associated with increased likelihoods for errors, the memory system controller 115 may adjust an operation of the identified memory devices 130. For example, for memory devices 130 identified as being associated with an increased likelihood for errors, the memory system controller 115 may decrease a quantity of access operations, decrease a rate of performing access operations, adjust a threshold voltage for the access operations, or a combination thereof. That is, the memory system controller 115 may adjust a value of an operating parameter from a first value to a second value that is associated with a decreased operating temperature for the memory devices 130 identified as being associated with an increased likelihood for errors. Then, memory devices 130 that were not identified as associated with an increased likelihood for errors may continue to operate according to the first value of the parameter while the memory devices 130 that were identified as associated with an increased likelihood for errors may operate according to the second value of the parameter.

The system 100 may include any quantity of non-transitory computer readable media that support operating memory die based on temperature data. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

Figure 2:
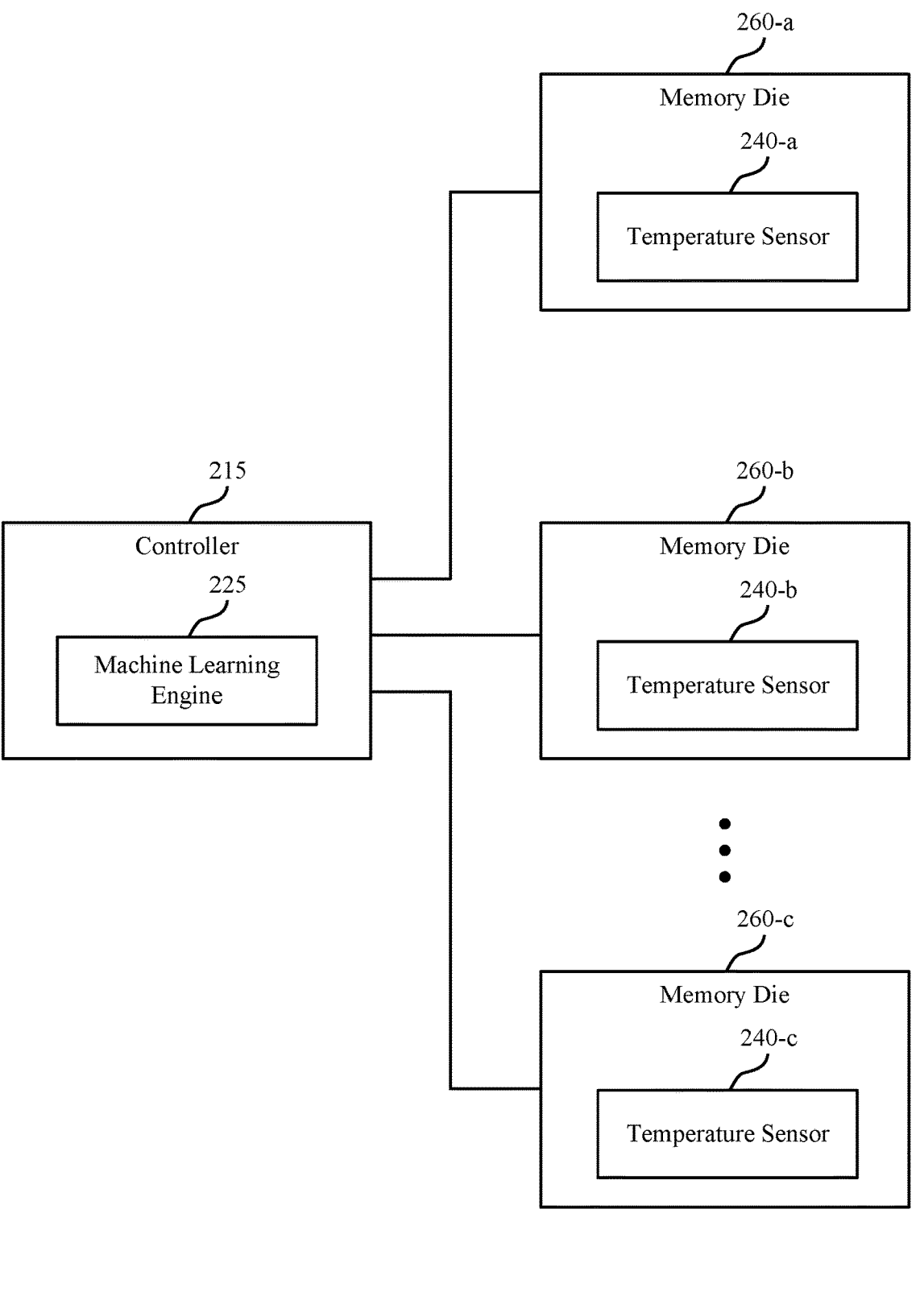
FIG. 2 illustrates an example of a memory system that supports operating memory die based on temperature data in accordance with examples as disclosed herein.

FIG. 2 illustrates an example of a memory system 200 that supports operating memory die based on temperature data in accordance with examples as disclosed herein. The memory system 200 may be a memory system 110 as described with reference to FIG. 1. For example, the controller 215 may include aspects of a memory system controller 115 or a local controller 135; the machine learning engine 225 may be an example of the machine learning engine 125; the memory dies 260 may be examples of the memory devices 130 or memory dies 160; and the temperature sensors 240 may be examples of the temperature sensors 140.

The controller 215 may be coupled with each of the memory dies 260 and may receive temperature data from the temperature sensors 240 coupled with each of the memory dies 260. For example, the controller 215 may receive a temperature measured at the memory die 260-*a* from the temperature sensor 240-*a*, a temperature measured at the memory die 260-*b* from the temperature sensor 240-*b*, and a temperature measured at the memory die 260-*c* from the temperature sensor 240-*c*. In some cases, the temperature sensors 240 may be coupled with the memory dies 260 at a middle portion of the memory dies 260. Additionally or alternatively, the temperature sensors 240 may be coupled with a portion of the memory dies 260 that is associated with a higher operating temperature when compared to other portions of the memory dies 260.

The temperature sensors 240 may send measured temperatures (e.g., absolute temperatures) to the controller 215. In one example, the temperature sensors 240 may send the temperatures to the controller 215 directly. In another example, the memory dies 260 may include a controller (e.g., such as a local memory controller as described with reference to FIG. 1) that may be coupled with the temperature sensor 240. Here, the temperature sensors 240 may send the temperatures to the controller 215 via the controller. In some cases, the temperature sensors 240 may send the temperatures continuously to the controller 215. In some other cases, the temperature sensors 240 may send the temperatures to the controller 215 periodically. Additionally, the temperature sensors 240 may transmit a temperature measured at the corresponding memory die 260 in response to a trigger (e.g., in response to a quantity of errors detected at the memory die 260 exceeding a threshold, in response to the temperature measured at the corresponding memory die 260 exceeding a threshold).

Based on receiving the temperatures from the temperature sensors 240, the controller 215 may identify, for each memory die 260, whether the memory die 260 is associated with an increased likelihood of errors. For example, the controller 215 may determine a likelihood of error for each memory die 260 based on the received temperature of the memory die 260 and one or more additional parameters. In one case, the additional parameters may include a duration of the memory dies 260 being certain temperature. For example, the controller 215 may store one or more previously-received temperatures of the memory dies 260 (e.g., in local memory at the controller 215). Here, the controller 215 may identify that a memory die 260 is associated with a greater likelihood of errors in cases that both the previously-received temperatures and a recently-received temperature of the memory die 260 exceeds a threshold (e.g., when compared to a case where a previously-received temperature is below the threshold and the most recently-received temperature exceeds the threshold). That is, the controller 215 may identify that a memory die 260 has an increased likelihood of errors when a duration of a memory die 260 having a relatively high or low temperature is larger when compared to cases that the duration of the memory die 260 having the relatively high or low temperature is shorter.

Based on receiving the temperatures from the temperature sensors 240, the controller 215 may identify, for each memory die 260, whether the memory die 260 is associated with an increased likelihood of errors. For example, the controller 215 may determine a likelihood of error for each memory die 260 based on the received temperature of the memory die 260 and one or more additional parameters. In one case, the additional parameters may include a duration of the memory dies 260 being certain temperatures. For example, the controller 215 may store one or more previously-received temperatures of the memory dies 260 (e.g., in local memory at the controller 215). Here, the controller 215 may identify that a memory die 260 is associated with a greater likelihood of errors in cases that both the previously-received temperatures and a recently-received temperature of the memory die 260 exceeds a threshold (e.g., when compared to a case where a previously-received temperature is below the threshold and the most recently-received temperature exceeds the threshold). That is, the controller 215 may identify that a memory die 260 has an increased likelihood of errors when a duration of a memory die 260 having a relatively high or low temperature is larger when compared to cases that the duration of the memory die 260 having the relatively high or low temperature is shorter.

In another case, the additional parameters may include a quantity of errors detected at the memory die 260. Here, the memory dies 260 may communicate, to the controller 215, a quantity of errors detected at the memory die 260 (e.g., during a scrub operation, during a preconfigured quantity of access operations). The controller 215 may then identify that a memory die 260 as having a greater likelihood of errors in cases that the memory die 260 has a large quantity of detected errors when compared to cases that the memory die 260 has a smaller quantity of detected errors. In some other cases, the additional parameters may include a type of access operations performed at the memory die 260. For example, the controller 215 may identify that a memory die 260 as having a greater likelihood of errors in cases that the memory die 260 that performs more write operations when compared to a memory die 260 that performs more read operations (e.g., and less write operations).

In another case, the additional parameters may include a quantity of errors detected at the memory die 260. Here, the memory dies 260 may communicate, to the controller 215, a quantity of errors detected at the memory die 260 (e.g., during a scrub operation, during a preconfigured quantity of access operations). The controller 215 may then identify a memory die 260 as having a greater likelihood of errors in cases that the memory die 260 has a large quantity of detected errors when compared to cases that the memory die 260 has a smaller quantity of detected errors. In some other cases, the additional parameters may include a type of access operations performed at the memory die 260. For example, the controller 215 may identify a memory die 260 as having a greater likelihood of errors in cases that the memory die 260 performs more write operations when compared to a memory die 260 that performs more read operations (e.g., and less write operations).

The controller 215 may identify the likelihood of errors associated with each memory die 260 based on analyzing parameters using a machine learning algorithm stored by a machine learning engine 225. For example, the machine learning engine 255 may receive inputs including the temperature of the memory die 260 (e.g., measured by the temperature sensor 240) and one or more of a temperature of a memory die 260, a duration of the temperature of the memory die 260, a differential range temperature associated with the memory die 260, a detected quantity of errors at the memory die 260, and a type of access operations performed by the memory die 260. Then, the machine learning engine 225 may output an identified likelihood of errors associated with that memory die 260. In some instances, the machine learning engine 225 may be preconfigured (e.g., prior to the memory system 200 being coupled with a host system). Additionally or alternatively, a host system may update the machine learning engine 225 dynamically (e.g., while the memory system 200 is coupled with the host system).

The controller 215 may adjust one or more parameters for operating memory dies 260 identified as being associated with increased likelihood of errors. That is, the controller 215 may adjust the parameters to values that are associated with decreased operating temperatures of the memory die 260. For example, the controller 215 may decrease a rate of executing access operations at memory dies 260 (e.g., may slow a speed for executing write operations) identified as being associated with the increased likelihood of errors. In another example, the controller 215 may adjust a threshold voltage associated with access operations at the identified memory die 260. In cases that the temperature sensor 240 measures a relatively high temperature at the memory die 260, the controller 215 may decrease the threshold voltage associated with access operations at the memory die 260 (e.g., which is associated with a decreased operating temperature). In cases that the temperature sensor 240 measures a relatively low temperature at the memory die 260, the controller 215 may increase the threshold voltage associated with access operations at the memory die 260 (e.g., which is associated with an increased operating temperature).

In another example, the controller 215 may decrease a quantity of access operations executed at memory dies 260 identified as being associated with the increased likelihood of errors. Here, the controller 215 may additionally increase a quantity of access operations executed at one or more memory dies 260 identified as not being associated with an increased likelihood of errors (e.g., to maintain a throughput of the memory system 200). For example, in cases that the controller 215 identifies the memory die 260-b as being associated with an increased likelihood of errors, the controller 215 may decrease a quantity of access operations executed at the memory die 260-b (e.g., which may be associated with a decrease in temperature of the memory die 260-b). Additionally, the controller 215 may increase the quantity of access operations executed at one or more of the other memory dies 260 not identified as being associated with the increased likelihood of errors (e.g., memory die 260-a or memory die 260-c). In some cases, the controller 215 may select a memory die 260 to increase the quantity of access operations based on the identified likelihood of errors associated with the memory die 260, based on the temperature measured at the memory die 260, or a combination thereof. For example, in cases that the controller 215 identifies that both the memory die 260-a and the memory die 260-c are not associated with an increased likelihood of errors, the controller 215 may increase the quantity of operations at the memory die 260 associated with the smallest identified likelihood of errors. Additionally or alternatively, the controller 215 may increase the quantity of operations at the memory die 260 associated with the smallest measured temperature.

By adjusting one or more parameters for operating memory dies 260 identified as being associated with increased likelihood of errors to values associated with decreased operating temperatures, the controller 215 may improve a reliability of the memory system 200. That is, the controller 215 may decrease a likelihood of temperature-induced errors at the memory dies 260 by adjusting operating parameters for memory dies 260 identified as being at an increased risk for temperature-induced errors to values associated with decreased temperatures.

Figure 3:
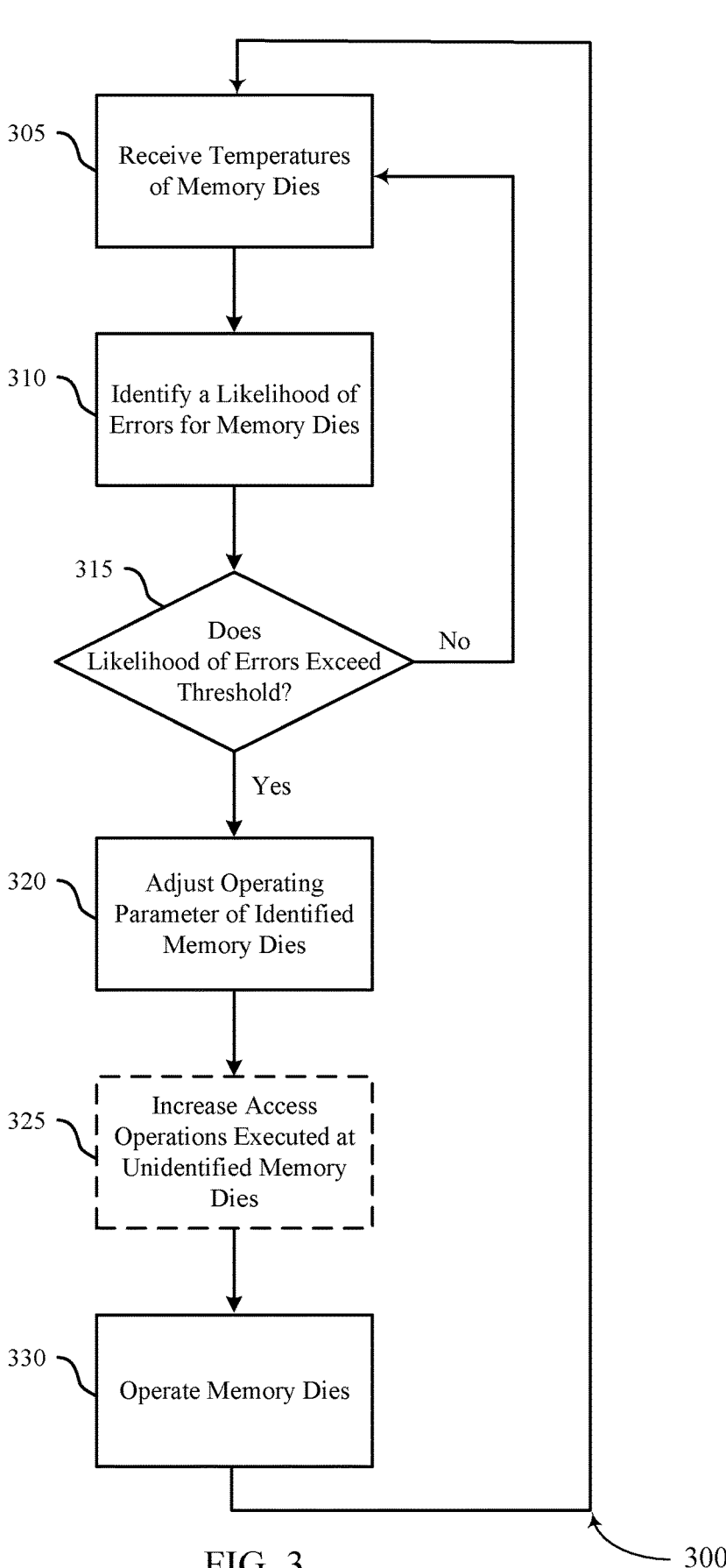
FIG. 3 illustrates an example of a flowchart that supports operating memory die based on temperature data in accordance with examples as disclosed herein.

FIG. 3 illustrates an example of a flowchart 300 that supports operating memory die based on temperature data in accordance with examples as disclosed herein. The operations of the flowchart 300 may be performed by a memory system as described with reference to FIGS. 1 and 2. For example, a controller (e.g., as described with reference to FIGS. 1 and 2) of a memory system that includes a set of memory dies may perform each of the features of the flowchart 300.

At 305, the controller may receive temperatures measured at the memory dies. In some cases, the controller may receive the temperatures from temperature sensors at each memory die continuously, periodically, or in response to a trigger. Then the controller may proceed to 310.

At 310, the controller may identify (e.g., using a machine learning engine) a likelihood of errors associated with each memory die. For example, the controller may identify the likelihood of errors at a memory die based on one or more of the temperature measured at the memory die (e.g., by the temperature sensor at that memory die), a duration of the temperature, a range of temperatures measured at the memory die, a differential temperature of the memory die, a type of accesso operations performed at the memory die, and a quantity of errors detected at the memory die. Then controller may proceed to 315.

At 310, the controller may identify (e.g., using a machine learning engine) a likelihood of errors associated with each memory die. For example, the controller may identify the likelihood of errors at a memory die based on one or more of the temperature measured at the memory die (e.g., by the temperature sensor at that memory die), a duration of the temperature, a range of temperatures measured at the memory die, a differential temperature of the memory die, a type of access operations performed at the memory die, and a quantity of errors detected at the memory die. Then the controller may proceed to 315.

At 320, the controller may adjust one or more parameters for operating the memory dies identified as being associated with the increased likelihood errors from a first value to a second value associated with a decreased operating temperature (e.g., when compared to the first value). For example, the controller may decrease a rate of performing access operations memory dies identified as being associated with the increased likelihood errors. Additionally, the controller may decrease a quantity of threshold voltage associated with access operations at the memory dies identified as being associated with the increased likelihood errors. In some other examples, the controller may decrease a quantity of access operations executed at the memory dies identified as being associated with the increased likelihood errors. In cases that the controller decreases a quantity of access operations executed at the memory dies identified as being associated with the increased likelihood errors, the controller may proceed to 325. Otherwise, the controller may proceed to 330.

At 325, the controller may optionally increase a quantity of access operations executed at one or more memory dies identified as not being associated with the increased likelihood of errors (e.g., to maintain a throughput of the memory system). For example, the controller may adjust the parameter associated with the quantity of access operations executed by a memory die identified as not being associated with the increased likelihood of errors from the first value to a third value (e.g., that may be associated with an increased operating temperature). Then, the controller may proceed to 330.

At 330, the controller may operate the memory dies. That is, the controller may operate the memory dies identified as not being associated with the increased likelihood of errors according to the first value of the operating parameter while operating the memory dies identified as being associated with the increased likelihood of errors according to the second value of the operating parameter. In cases that the controller optionally increased the quantity of access operations executed by the memory die identified as not being associated with the increased likelihood of errors to the third value at 325, the controller may additionally operate this memory die according to the third value of the operating parameter. In such cases, the controller may be configured to adjust parameters of both dies that may be associated with an increased likelihood of errors and other dies to maintain an overall performance of the memory system.

Figure 4:
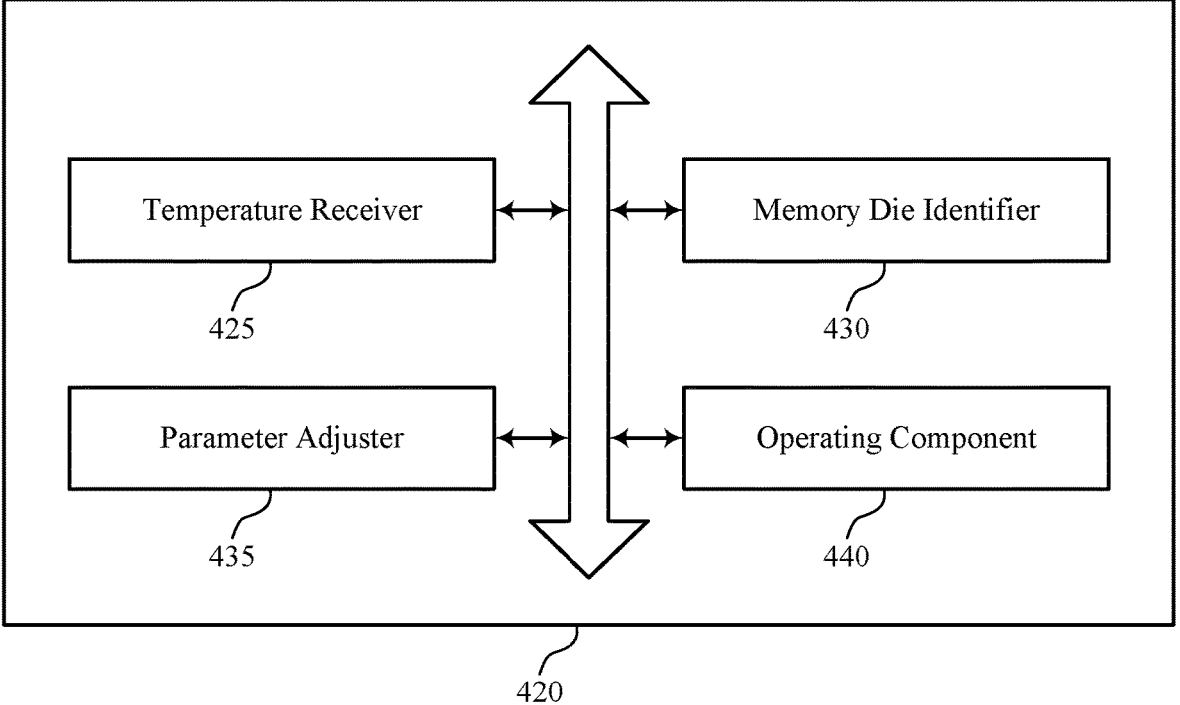
FIG. 4 shows a block diagram of a memory system that supports operating memory die based on temperature data in accordance with examples as disclosed herein.

FIG. 4 shows a block diagram 400 of a memory system 420 that supports operating memory die based on temperature data in accordance with examples as disclosed herein. The memory system 420 may be an example of aspects of a memory system as described with reference to FIGS. 1 through 3. The memory system 420, or various components thereof, may be an example of means for performing various aspects of operating memory die based on temperature data as described herein. For example, the memory system 420 may include a temperature receiver 425, a memory die identifier 430, a parameter adjuster 435, an operating component 440, or any combination thereof. Each of these components may communicate, directly or indirectly, with one another (e.g., via one or more buses).

The temperature receiver 425 may be configured as or otherwise support a means for receiving, from a plurality of temperature sensors corresponding to a plurality of memory dies, temperatures measured at the plurality of memory dies. The memory die identifier 430 may be configured as or otherwise support a means for identifying that operation of a first memory die of the plurality of memory dies is associated with an increased likelihood of errors based at least in part on a temperature measured at the first memory die by one of the plurality of temperature sensors. The parameter adjuster 435 may be configured as or otherwise support a means for adjusting, based at least in part on the identifying, a parameter for operating the first memory die from a first value to a second value associated with a decreased operating temperature when compared to the first value. The operating component 440 may be configured as or otherwise support a means for operating, based at least in part on the adjusting, the first memory die according to the second value of the parameter and one or more second memory dies from the plurality of memory dies operating according to the first value of the parameter.

In some examples, to support adjusting the parameter from the first value to the second value, the parameter adjuster 435 may be configured as or otherwise support a means for decreasing a rate of executing access operations from a first rate to a second rate.

In some examples, to support adjusting the parameter from the first value to the second value, the parameter adjuster 435 may be configured as or otherwise support a means for decreasing a quantity of access operations executed by the first memory die over a duration from a first quantity of access operations to a second quantity of access operations.

In some examples, the operating component 440 may be configured as or otherwise support a means for increasing, from the first value to a third value, a quantity of access operations executed by a third memory die over the duration based at least in part on the decreasing. In some examples, the operating component 440 may be configured as or otherwise support a means for operating the third memory die according to the third value concurrent with operating the first memory die according to the second value and the one or more second memory dies according to the first value.

In some examples, the memory die identifier 430 may be configured as or otherwise support a means for identifying the third memory die based at least in part on a second temperature measured by one of the plurality of temperature sensors.

In some examples, to support adjusting the parameter from the first value to the second value, the parameter adjuster 435 may be configured as or otherwise support a means for adjusting a threshold voltage associated with access operations at the first memory die from a first threshold voltage to a second threshold voltage.

In some examples, the first threshold voltage is greater than the second threshold voltage.

In some examples, the memory die identifier 430 may be configured as or otherwise support a means for analyzing, using a machine learning algorithm, sets of parameters corresponding to the plurality of memory dies to determine likelihoods of errors associated with the plurality of memory dies, where the identifying is based at least in part on the analyzing.

In some examples, the memory die identifier 430 may be configured as or otherwise support a means for comparing the likelihoods of errors to a threshold, where identifying that the operation of the first memory die is associated with the increased likelihood of errors is based at least in part on a determined likelihood of errors associated with the first memory die exceeding the threshold.

In some examples, the sets of parameters includes an absolute temperature of a corresponding memory die, a difference between a first temperature during a write operation and a second temperature during a read operation at the corresponding memory die, types of operations performed at the corresponding memory die, a quantity of errors over a duration at the corresponding memory die, or a combination thereof.

In some examples, the operating component 440 may be configured as or otherwise support a means for operating the plurality of memory dies according to the first value of the parameter, where receiving the temperatures is based at least in part on operating the plurality of memory dies according to the first value of the parameter.

FIG. 5 shows a flowchart illustrating a method 500 that supports operating memory die based on temperature data in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving, from a plurality of temperature sensors corresponding to a plurality of memory dies, temperatures measured at the plurality of memory dies. The operations of 505 may be performed in accordance with examples as disclosed herein. In some examples, aspects of the operations of 505 may be performed by a temperature receiver 425 as described with reference to FIG. 4.

At 510, the method may include identifying that operation of a first memory die of the plurality of memory dies is associated with an increased likelihood of errors based at least in part on a temperature measured at the first memory die by one of the plurality of temperature sensors. The operations of 510 may be performed in accordance with examples as disclosed herein. In some examples, aspects of the operations of 510 may be performed by a memory die identifier 430 as described with reference to FIG. 4.

At 515, the method may include adjusting, based at least in part on the identifying, a parameter for operating the first memory die from a first value to a second value associated with a decreased operating temperature when compared to the first value. The operations of 515 may be performed in accordance with examples as disclosed herein. In some examples, aspects of the operations of 515 may be performed by a parameter adjuster 435 as described with reference to FIG. 4.

At 520, the method may include operating, based at least in part on the adjusting, the first memory die according to the second value of the parameter and one or more second memory dies from the plurality of memory dies operating according to the first value of the parameter. The operations of 520 may be performed in accordance with examples as disclosed herein. In some examples, aspects of the operations of 520 may be performed by an operating component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving, from a plurality of temperature sensors corresponding to a plurality of memory dies, temperatures measured at the plurality of memory dies; identifying that operation of a first memory die of the plurality of memory dies is associated with an increased likelihood of errors based at least in part on a temperature measured at the first memory die by one of the plurality of temperature sensors; adjusting, based at least in part on the identifying, a parameter for operating the first memory die from a first value to a second value associated with a decreased operating temperature when compared to the first value; and operating, based at least in part on the adjusting, the first memory die according to the second value of the parameter and one or more second memory dies from the plurality of memory dies operating according to the first value of the parameter.

Aspect 2: The method, apparatus, or non-transitory computer-readable medium of aspect 1 where adjusting the parameter from the first value to the second value includes operations, features, circuitry, logic, means, or instructions, or any combination thereof for decreasing a rate of executing access operations from a first rate to a second rate.

Aspect 3: The method, apparatus, or non-transitory computer-readable medium of any of aspects 1 through 2 where adjusting the parameter from the first value to the second value includes operations, features, circuitry, logic, means, or instructions, or any combination thereof for decreasing a quantity of access operations executed by the first memory die over a duration from a first quantity of access operations to a second quantity of access operations.

Aspect 4: The method, apparatus, or non-transitory computer-readable medium of aspect 3, further including operations, features, circuitry, logic, means, or instructions, or any combination thereof for increasing, from the first value to a third value, a quantity of access operations executed by a third memory die over the duration based at least in part on the decreasing and operating the third memory die according to the third value concurrent with operating the first memory die according to the second value and the one or more second memory dies according to the first value.

Aspect 5: The method, apparatus, or non-transitory computer-readable medium of aspect 4, further including operations, features, circuitry, logic, means, or instructions, or any combination thereof for identifying the third memory die based at least in part on a second temperature measured by one of the plurality of temperature sensors.

Aspect 6: The method, apparatus, or non-transitory computer-readable medium of any of aspects 1 through 5 where adjusting the parameter from the first value to the second value includes operations, features, circuitry, logic, means, or instructions, or any combination thereof for adjusting a threshold voltage associated with access operations at the first memory die from a first threshold voltage to a second threshold voltage.

Aspect 7: The method, apparatus, or non-transitory computer-readable medium of aspect 6 where the first threshold voltage is greater than the second threshold voltage.

Aspect 8: The method, apparatus, or non-transitory computer-readable medium of any of aspects 1 through 7, further including operations, features, circuitry, logic, means, or instructions, or any combination thereof for analyzing, using a machine learning algorithm, sets of parameters corresponding to the plurality of memory dies to determine likelihoods of errors associated with the plurality of memory dies, where the identifying is based at least in part on the analyzing.

Aspect 9: The method, apparatus, or non-transitory computer-readable medium of aspect 8, further including operations, features, circuitry, logic, means, or instructions, or any combination thereof for comparing the likelihoods of errors to a threshold, where identifying that the operation of the first memory die is associated with the increased likelihood of errors is based at least in part on a determined likelihood of errors associated with the first memory die exceeding the threshold.

Aspect 10: The method, apparatus, or non-transitory computer-readable medium of any of aspects 8 through 9 where the sets of parameters includes an absolute temperature of a corresponding memory die, a difference between a first temperature during a write operation and a second temperature during a read operation at the corresponding memory die, types of operations performed at the corresponding memory die, a quantity of errors over a duration at the corresponding memory die, or a combination thereof.

Aspect 11: The method, apparatus, or non-transitory computer-readable medium of any of aspects 1 through 10, further including operations, features, circuitry, logic, means, or instructions, or any combination thereof for operating the plurality of memory dies according to the first value of the parameter, where receiving the temperatures is based at least in part on operating the plurality of memory dies according to the first value of the parameter.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phospho-rous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

receiving, from a plurality of temperature sensors corresponding to a plurality of memory dies, temperatures measured at the plurality of memory dies, the temperatures including a first temperature measured at a first memory die of the plurality of memory dies;

identifying, based at least in part on the measured temperatures and second temperatures previously measured at the plurality of memory dies, durations that the plurality of memory dies have been at respective measured temperatures;

receiving a set of additional parameters corresponding to the plurality of memory dies, wherein the set of additional parameters include comparative quantities of different types of access operations performed at the plurality of memory dies;

identifying, based at least in part on receiving the temperatures, identifying the durations, and receiving the set of additional parameters, a likelihood of errors at the first memory die based at least in part on operations of the first memory die at the first temperature;

adjusting, based at least in part on determining that the likelihood of errors at the first memory die based at least in part on operations of the first memory die at the first temperature satisfies a threshold likelihood, an operating parameter of the first memory die from a first value to a second value associated with decreasing an operating temperature of the first memory die from the first temperature measured at the first memory die; and operating, based at least in part on the adjusting, the first memory die according to the second value of the operating parameter and concurrently operating one or more second memory dies from the plurality of memory dies according to the first value of the operating parameter.

2. The method of claim 1, wherein:

adjusting the operating parameter from the first value to the second value comprises decreasing a rate of executing access operations from a first rate of executing access operations to a second rate of executing access operations;

operating the first memory die according to the second value of the operating parameter comprises operating the first memory die according to the second rate of executing access operations; and concurrently operating the one or more second memory dies according to the first value of the operating parameter comprises operating the one or more second memory dies according to the first rate of executing access operations.

3. The method of claim 1, wherein:

adjusting the operating parameter from the first value to the second value comprises decreasing a quantity of access operations executed by the first memory die over a duration from a first quantity of access operations to a second quantity of access operations;

operating the first memory die according to the second value of the operating parameter comprises operating the first memory die to execute the second quantity of access operations over the duration; and concurrently operating the one or more second memory dies according to the first value of the operating parameter comprises operating the one or more second memory dies to execute the first quantity of access operations over the duration.

4. The method of claim 3, further comprising:

increasing a quantity of access operations executed by a third memory die over the duration from the first quantity of access operations to a third quantity of access operation based at least in part on the decreasing; and operating, concurrent with operating the first memory die to execute the second quantity of access operations over the duration and operating the one or more second memory dies to execute the first quantity of access operations over the duration, the third memory die to execute the third quantity of access operations over the duration.

5. The method of claim 4, further comprising:
identifying the third memory die based at least in part on a second temperature measured by one of the plurality of temperature sensors.

6. The method of claim 1, wherein:
adjusting the operating parameter from the first value to the second value comprises adjusting a threshold voltage associated with access operations at the first memory die from a first threshold voltage to a second threshold voltage;
operating the first memory die according to the second value of the operating parameter comprises operating the first memory die according to the second threshold voltage; and
concurrently operating the one or more second memory dies according to the first value of the operating parameter comprises operating the one or more second memory dies according to the first threshold voltage.

7. The method of claim 6, wherein the first threshold voltage is greater than the second threshold voltage.

8. The method of claim 1, further comprising:
analyzing, using a machine learning algorithm, sets of parameters corresponding to the plurality of memory dies to determine likelihoods of errors associated with the plurality of memory dies based at least in part on operations of the plurality of memory dies at the temperatures measured at the plurality of memory dies, wherein identifying the likelihood of errors is based at least in part on the analyzing.

9. The method of claim 8, wherein the sets of parameters comprises an absolute temperature of a corresponding memory die, a difference between a second temperature during a write operation and a third temperature during a read operation at the corresponding memory die, types of operations performed at the corresponding memory die, a quantity of errors over a duration at the corresponding memory die, or a combination thereof.

10. The method of claim 1, further comprising:
operating the plurality of memory dies according to the first value of the operating parameter, wherein receiving the temperatures is based at least in part on operating the plurality of memory dies according to the first value of the operating parameter.

11. An apparatus, comprising:
a plurality of memory dies;
a plurality of temperature sensors each coupled with one of the plurality of memory dies and configured to measure a temperature at the plurality of memory dies; and
a controller coupled with the plurality of memory dies and the plurality of temperature sensors, the controller configured to:
receive, from the plurality of temperature sensors, temperatures measured at the plurality of memory dies, the temperatures including a first temperature measured at a first memory die of the plurality of memory dies;
identify, based at least in part on the measured temperatures and second temperatures previously measured at the plurality of memory dies, durations that the plurality of memory dies have been at respective measured temperatures;

receive a set of additional parameters corresponding to the plurality of memory dies, wherein the set of additional parameters include comparative quantities of different types of access operations performed at the plurality of memory dies;
identify, based at least in part on receiving the temperatures, identifying the durations, and receiving the set of additional parameters, a likelihood of errors at the first memory die based at least in part on operations of the first memory die at the first temperature;
adjust, based at least in part on determining that the likelihood of errors at the first memory die based at least in part on operations of the first memory die at the first temperature satisfies a threshold likelihood, an operating parameter of the first memory die from a first value to a second value associated with decreasing an operating temperature of the first memory die from the first temperature measured at the first memory die; and
operate, based at least in part on the adjusting, the first memory die according to the second value of the operating parameter and concurrently operate one or more second memory dies from the plurality of memory dies according to the first value of the operating parameter.

12. The apparatus of claim 11, wherein:
to adjust the operating parameter from the first value to the second value, the controller is configured to decrease a rate of executing access operations from a first rate of executing access operations to a second rate of executing access operations;
to operate the first memory die according to the second value of the operating parameter, the controller is configured to operate the first memory die according to the second rate of executing access operations; and
to concurrently operate the one or more second memory dies according to the first value of the operating parameter, the controller is configured to operate the one or more second memory dies according to the first rate of executing access operations.

13. The apparatus of claim 11, wherein:
to adjust the operating parameter from the first value to the second value, the controller is configured to decrease a quantity of access operations executed by the first memory die over a duration from a first quantity of access operations to a second quantity of access operations;
to operate the first memory die according to the second value of the operating parameter, the controller is configured to operate the first memory die to execute the second quantity of access operations over the duration; and
to concurrently operate the one or more second memory dies according to the first value of the operating parameter, the controller is configured to operate the one or more second memory dies to execute the first quantity of access operations over the duration.

14. The apparatus of claim 13, wherein the controller is further configured to:
increase a quantity of access operations executed by a third memory die over the duration from the first quantity of access operations to a third quantity of access operation based at least in part on the decreasing; and
operate, concurrent with operating the first memory die to execute the second quantity of access operations over the duration and operating the one or more second memory dies to execute the first quantity of access operations over the duration, the third memory die to execute the third quantity of access operations over the duration.

15. The apparatus of claim 14, wherein the controller is further configured to:
  identify the third memory die based at least in part on a second temperature measured by one of the plurality of temperature sensors.

16. The apparatus of claim 11, wherein:
  to adjust the operating parameter from the first value to the second value, the controller is configured to adjust a threshold voltage associated with access operations at the first memory die from a first threshold voltage to a second threshold voltage;
  to operate the first memory die according to the second value of the operating parameter, the controller is configured to operate the first memory die according to the second threshold voltage; and
  to concurrently operate the one or more second memory dies according to the first value of the operating parameter, the controller is configured to operate the one or more second memory dies according to the first threshold voltage.

17. The apparatus of claim 16, wherein the first threshold voltage is greater than the second threshold voltage.

18. The apparatus of claim 11, wherein the controller is further configured to:
  analyze, using a machine learning algorithm, sets of parameters corresponding to the plurality of memory dies to determine likelihoods of errors associated with the plurality of memory dies based at least in part on operations of the plurality of memory dies at the temperatures measured at the plurality of memory dies, wherein identifying the likelihood of errors is based at least in part on the analyzing.

19. The apparatus of claim 18, wherein the sets of parameters comprises an absolute temperature of a corresponding memory die, a difference between a second temperature during a write operation and a third temperature during a read operation at the corresponding memory die, types of operations performed at the corresponding memory die, a quantity of errors over a duration at the corresponding memory die, or a combination thereof.

20. The apparatus of claim 11, wherein the controller is further configured to:
  operate the plurality of memory dies according to the first value of the operating parameter, wherein receiving the temperatures is based at least in part on operating the plurality of memory dies according to the first value of the operating parameter.

21. A non-transitory computer-readable medium storing code, the code comprising instructions executable by a processor to:
  receive, from a plurality of temperature sensors corresponding to a plurality of memory dies, temperatures measured at the plurality of memory dies, the temperatures including a first temperature measured at a first memory die of the plurality of memory dies;
  identify, based at least in part on the measured temperatures and second temperatures previously measured at the plurality of memory dies, durations that the plurality of memory dies have been at respective measured temperatures;
  receive a set of additional parameters corresponding to the plurality of memory dies, wherein the set of additional parameters include comparative quantities of different types of access operations performed at the plurality of memory dies;
  identify, based at least in part on receiving the temperatures, identifying the durations, and receiving the set of additional parameters, a likelihood of errors at the first memory die based at least in part on operations of the first memory die at the first temperature;
  adjust, based at least in part on determining that the likelihood of errors at the first memory die based at least in part on operations of the first memory die at the first temperature satisfies a threshold likelihood, an operating parameter of the first memory die from a first value to a second value associated with decreasing an operating temperature of the first memory die from the first temperature measured at the first memory die; and
  operate, based at least in part on the adjusting, the first memory die according to the second value of the operating parameter and concurrently operate one or more second memory dies from the plurality of memory dies according to the first value of the operating parameter.

22. The non-transitory computer-readable medium of claim 21, wherein:
  the instructions to adjust the operating parameter from the first value to the second value are executable by the processor to decrease a rate of executing access operations from a first rate of executing access operations to a second rate of executing access operations;
  the instructions to operate the first memory die according to the second value of the operating parameter are executable by the processor to operate the first memory die according to the second rate of executing access operations; and
  the instructions to concurrently operate the one or more second memory dies according to the first value of the operating parameter are executable by the processor to operate the one or more second memory dies according to the first rate of executing access operations.

23. The non-transitory computer-readable medium of claim 21, wherein:
  the instructions to adjust the operating parameter from the first value to the second value are executable by the processor to decrease a quantity of access operations executed by the first memory die over a duration from a first quantity of access operations to a second quantity of access operations;
  the instructions to operate the first memory die according to the second value of the operating parameter are executable by the processor to operate the first memory die to execute the second quantity of access operations over the duration; and
  the instructions to concurrently operate the one or more second memory dies according to the first value of the operating parameter are executable by the processor to operate the one or more second memory dies to execute the first quantity of access operations over the duration.

24. The method of claim 1, wherein the likelihood of errors at the first memory die is identified based at least in part on the comparative quantities of different types of access operations performed at the plurality of memory dies indicating that the first memory die performs more write operations when compared to the one or more second memory dies.

25. The apparatus of claim 11, wherein the likelihood of errors at the first memory die is identified based at least in part on the comparative quantities of different types of access operations performed at the plurality of memory dies indicating that the first memory die performs more write operations when compared to the one or more second memory dies.

\* \* \* \* \*